United States Patent
Yim et al.

(10) Patent No.: US 9,154,669 B2
(45) Date of Patent: Oct. 6, 2015

(54) IMAGE APPARATUS FOR DETERMINING TYPE OF IMAGE DATA AND METHOD FOR PROCESSING IMAGE APPLICABLE THERETO

(75) Inventors: Dale Yim, Suwon-si (KR); Sang-su Lee, Suwon-si (KR); Ho-chul Shin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 835 days.

(21) Appl. No.: 12/626,276

(22) Filed: Nov. 25, 2009

(65) Prior Publication Data
US 2010/0253837 A1 Oct. 7, 2010

(30) Foreign Application Priority Data
Apr. 7, 2009 (KR) .................. 10-2009-0029915

(51) Int. Cl.
H04N 7/12 (2006.01)
H04N 5/21 (2006.01)
H04N 5/217 (2011.01)
H04N 5/232 (2006.01)
H04N 21/4385 (2011.01)
H04N 5/46 (2006.01)

(52) U.S. Cl.
CPC .............. *H04N 5/21* (2013.01); *H04N 5/217* (2013.01); *H04N 5/232* (2013.01); *H04N 21/4385* (2013.01); *H04N 5/46* (2013.01)

(58) Field of Classification Search
USPC .......................... 375/240.01, 240.23, 240.27
IPC .......................................................... H04N 7/12
See application file for complete search history.

(56) References Cited

U.S. PATENT DOCUMENTS

| | | | |
|---|---|---|---|
| 5,339,113 | A | 8/1994 | Iwasaki |
| 7,684,617 | B2 * | 3/2010 | Yoshiura ................ 382/167 |
| 7,916,784 | B2 * | 3/2011 | MacInnis et al. .......... 375/240.1 |
| 2004/0027489 | A1 | 2/2004 | Gengintani et al. |
| 2004/0196407 | A1 | 10/2004 | Gengintani et al. |
| 2005/0141620 | A1 * | 6/2005 | Hattori ................ 375/240.25 |
| 2006/0209957 | A1 * | 9/2006 | Riemens et al. ......... 375/240.16 |
| 2008/0024659 | A1 * | 1/2008 | Tanaka ................ 348/452 |
| 2008/0123735 | A1 | 5/2008 | Kobayashi |
| 2009/0028247 | A1 * | 1/2009 | Suh et al. ............... 375/240.25 |
| 2010/0026896 | A1 * | 2/2010 | Yamauchi ............... 348/607 |

FOREIGN PATENT DOCUMENTS

JP 2006060358 A 3/2006

OTHER PUBLICATIONS

Extended European search report dated Jul. 7, 2010, issued by the European Patent Office in counterpart European Application No. 10156245.2-2202.

* cited by examiner

*Primary Examiner* — Tracy Li
(74) *Attorney, Agent, or Firm* — Sughrue Mion, PLLC

(57) ABSTRACT

An image apparatus and an image processing method are provided. The image apparatus determines a type of original format of inputted image data and determines a degree of noise reduction in accordance with the determined type of original format. As a result, an optimized noise reduction can be carried out.

34 Claims, 5 Drawing Sheets

FIG. 4

| Video Format | Progressive/ Interlace | Film/ Video | NTSC(North America)/ PAL(Europe) | Strength Value of DNR(digital noise reduction) |
|---|---|---|---|---|
| 60P Video | LOW | LOW | LOW | 1 |
| 50P Video | LOW | LOW | HIGH | 2 |
| 25P Film | LOW | HIGH | LOW | 3 |
| 60i NTSC Video | HIGH | LOW | LOW | 4 |
| 24P Film | LOW | HIGH | HIGH | 5 |
| 50i PAL Video | HIGH | LOW | HIGH | 6 |
| 60i 3:2 Puldown Film | HIGH | HIGH | LOW | 7 |
| 50i 2:2 Puldown Film | HIGH | HIGH | HIGH | 8 |

IMAGE APPARATUS FOR DETERMINING TYPE OF IMAGE DATA AND METHOD FOR PROCESSING IMAGE APPLICABLE THERETO

CROSS-REFERENCE TO RELATED APPLICATIONS

This application claims priority from Korean Patent Application No. 10-2009-29915, filed on Apr. 7, 2009, in the Korean Intellectual Property Office, the disclosure of which is incorporated herein by reference in its entirety.

BACKGROUND OF THE INVENTION

1. Field of the Invention

Apparatuses and methods consistent with the present invention relate to an image apparatus and a method for processing image data applicable thereto, and more particularly, to an image apparatus for determining a type of inputted image data and a method for processing image data applicable thereto.

2. Description of the Related Art

Recently, various types of image media have been developed. Accordingly, different forms of image services are provided by different image media businesses in different countries or regions. That is, image media businesses provide images recorded in different formats.

In order to provide a large amount of image data through a communication network with high image quality, image media businesses provide images in a compressed format, such as Motion Picture Experts Groups 2 (MPEG-2). Additionally, a compressed digital noise reducing device processes the brightness or saturation of the frame pixels to reduce noise.

However, since a related art image apparatus reduces noise indiscriminately, that is, regardless of the format of the original image before compression, there is a limit on optimizing noise reduction. Accordingly, a method for optimizing noise reduction is necessary.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided an image apparatus for optimizing noise reduction, which detects an original format of image data being inputted, and determines a degree of noise reduction according to the determined original format, and a method for processing image data applicable thereto.

The image apparatus and method may detect an original format of image data being inputted, using Motion Picture Experts Groups 2 (MPEG-2) header information of the inputted image data.

According to an aspect of the present invention, there is provided an image apparatus including an image input unit which receives image data, and a control unit which determines a type of original format of the inputted image data, and determines a degree of noise reduction in accordance with the determined type of the original format.

The control unit may determine the type of original format of the inputted image data, using header information of the inputted image data.

The inputted image data may be Motion Picture Experts Group 2 (MPEG-2) compressed image data, and the header information may be MPEG-2 header information.

The control unit may determine the type of original format of the inputted image data, using at least one of: interlace sequence information, interlace frame information, non-repeated field information, discrete cosine transform (DCT) type information, and frame rate information of the inputted image data.

The control unit may determine the original format of the inputted image data to be a progressive image, if the interlace sequence information indicates FALSE.

The control unit may determine the original format of the inputted image data to be an interlace video image, if the interlace sequence information indicates TRUE and the interlace frame information indicates TRUE.

The control unit may determine the type of original format of the inputted image data using the DCT type information, if the interlace sequence information indicates TRUE and the interlace frame information indicates TRUE, or determine the type of original format of the inputted image data using the non-repeated field information, if the interlace sequence information indicates TRUE and the interlace frame information indicates FALSE.

The control unit may count frames of a predetermined number of frames of the inputted image data, if the interlace sequence information indicates TRUE and the interlace frame information indicates FALSE. The counted frame may have the non-repeated field indicating FALSE, so that if the number of frames having the non-repeated field information indicating FALSE is zero, the control unit may determine the original format of the inputted image data to be 2:2 pulldown film, if the number of frames having the non-repeated field information indicating FALSE is a predetermined value, determine the original format of the inputted image data to be 3:2 pulldown film, and if the number of frames having the non-repeated field information indicating FALSE is not zero nor the predetermined value, may determine the original format of the inputted image data to be interlace video image.

The control unit may count frames of a predetermined number of frames of the inputted image data with reference to the DCT type information, if the interlace sequence information indicates TRUE and the interlace frame information indicates TRUE. The counted frames may have more field DCT macroblocks than frame DCT macroblocks, so that the control unit may determine the original format of the inputted image data to be 3:2 pulldown film image, if the number of the counted frames is within a predetermined range, or determine the original format of the inputted image data to be interlace video image, if the number of the counted frames exceeds the predetermined range.

The control unit may determine the original format of the inputted image data to be one of film image and video image, using the frame rate information.

The control unit may set a higher degree of noise reduction for image data having an interlace image original format than for image data having a progressive image original format. The control unit may set a higher degree of noise reduction for image data having a film image original format than for image data having a video image original format. The control unit may also set a higher degree of noise reduction for image data having a Phase Alternation Line (PAL) image original format than image data having a National Television System Committee (NTSC) image original format.

The control unit may determine the original format of the inputted image data to be one of 60p video, 50p video, 25p film, 60i NTSC video, 24p film, 50i PAL video, 60i NTSC 3:2 pulldown film, and 50i PAL 2:2 pulldown film.

According to another aspect of the present invention, there is provided an image processing method including receiving an input of image data, and determining a type of original format of the inputted image data, and determining a degree of noise reduction in accordance with the determined type of the original format.

The determining of the type of original format may include determining the type of original format of the inputted image data, using header information of the inputted image data.

The inputted image data may be Motion Picture Experts Group 2 (MPEG-2) compressed image data, and the header information may be MPEG-2 header information.

The determining of the type of original format may include determining the type of original format of the inputted image data, using at least one of: interlace sequence information, interlace frame information, non-repeated field information, discrete cosine transform (DCT) type information, and frame rate information of the inputted image data.

The determining of the type of original format may include determining the original format of the inputted image data to be a progressive image, if the interlace sequence information indicates FALSE.

The determining of the type of original format may include determining the original format of the inputted image data to be an interlace video image, if the interlace sequence information indicates TRUE and the interlace frame information indicates TRUE.

The determining of the type of original format may include determining the type of original format of the inputted image data using the DCT type information, if the interlace sequence information indicates TRUE and the interlace frame information indicates TRUE, or determining the type of original format of the inputted image data using the non-repeated field information, if the interlace sequence information indicates TRUE and the interlace frame information indicates FALSE.

The determining of the type of original format may include counting frames of a predetermined number of frames of the inputted image data, if the interlace sequence information indicates TRUE and the interlace frame information indicates FALSE, wherein the counted frame has the non-repeated field indicating FALSE. The determining of the type of original format may include, if the number of frames having the non-repeated field information indicating FALSE is 0, determining the original format of the inputted image data to be 2:2 pulldown film, if the number of frames having the non-repeated field information indicating FALSE is a predetermined value, determining the original format of the inputted image data to be 3:2 pulldown film, and if the number of frames having the non-repeated field information indicating FALSE is not 0 nor the predetermined value, determining the original format of the inputted image data to be interlace video image.

The determining of the type of original format may include counting frames of a predetermined number of frames of the inputted image data with reference to the DCT type information, if the interlace sequence information indicates TRUE and the interlace frame information indicates TRUE, wherein the counted frames has more field DCT macroblocks than frame DCT macroblocks. The determining of the type of original format may include determining the original format of the inputted image data to be 3:2 pulldown film image, if the number of the counted frames is within a predetermined range, or determining the original format of the inputted image data to be interlace video image, if the number of the counted frames exceeds the predetermined range.

The determining of the type of original format may include determining the original format of the inputted image data to be one of film image and video image, using the frame rate information.

The determining of the type of original format may include setting a higher degree of noise reduction for image data having an interlace image original format than for image data having a progressive image original format, setting a higher degree of noise reduction for image data having a film image original format than for image data having a video image original format, and setting a higher degree of noise reduction for image data having a Phase Alternation Line (PAL) image original format than image data having a National Television System Committee (NTSC) image original format.

The determining of the type of original format may include determining the original format of the inputted image data to be one of 60p video, 50p video, 25p film, 60i NTSC video, 24p film, 50i PAL video, 60i NTSC 3:2 pulldown film, and 50i PAL 2:2 pulldown film.

According to yet another aspect of the present invention, there is provided an image apparatus including an image input unit which receives an input of Motion Picture Experts Groups 2 (MPEG-2) compressed image data, and a control unit which determines a type of original format of the inputted image data, using MPEG-2 header information of the inputted image data.

The control unit may determine the type of original format of the inputted image data, using at least one of: interlace sequence information, interlace frame information, non-repeated field information, discrete cosine transform (DCT) type information, and frame rate information of the inputted image data.

The control unit may set deinterlacing or frame rate conversion for the inputted image data, depending on the determined type of original format.

According to yet another aspect of the present invention, there is provided an image processing method, including receiving an input of Motion Picture Experts Groups 2 (MPEG-2) compressed image data, and determining a type of original format of the inputted image data, using MPEG-2 header information of the inputted image data.

The determining may include determining the type of original format of the inputted image data, using at least one of: interlace sequence information, interlace frame information, non-repeated field information, discrete cosine transform (DCT) type information, and frame rate information of the inputted image data.

The image processing method may further include setting deinterlacing or frame rate conversion for the inputted image data, depending on the determined type of original format.

BRIEF DESCRIPTION OF THE DRAWINGS

The above and/or other aspects of the present invention will become more apparent by describing certain exemplary embodiments of the present invention with reference to the accompanying drawings, in which:

FIG. 4 is a table listing corresponding noise reduction according to the original formats of the image data, according to an exemplary embodiment of the present invention.

DETAILED DESCRIPTION OF EXEMPLARY EMBODIMENTS

Figure 1:
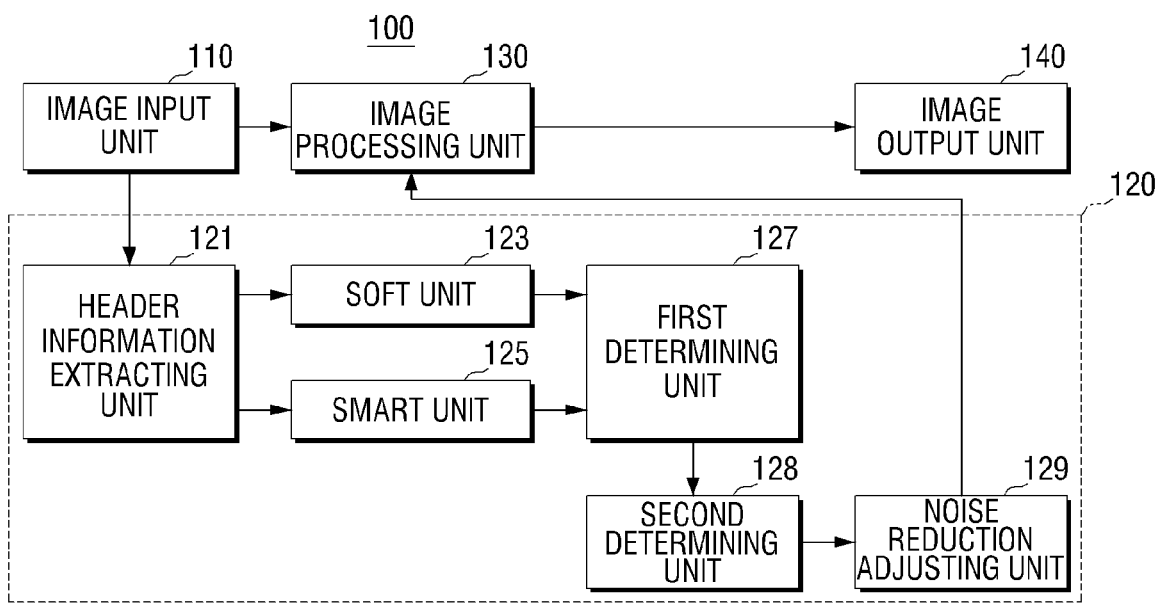
FIG. 1 is a block diagram of an image apparatus in accordance with an exemplary embodiment of the present invention.

Exemplary embodiments of the present invention are described in greater detail below with reference to the accompanying drawings.

In the following description, like drawing reference numerals are used for the like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a block diagram of an image apparatus according to an exemplary embodiment of the present invention. Referring to FIG. 1, the image apparatus 100 may include an image input unit 110, a control unit 120, an image processing unit 130, and an image output unit 140.

The image input unit 110 receives image data. By way of example, the image input unit 110 may receive image data compressed in Motion Picture Experts Groups 2 (MPEG-2) format.

The image input unit 110 may receive various forms of image data. Specifically, the image input unit 110 may receive stored MPEG-2 image data from a storage media. By way of example, the image input unit 110 may receive MPEG-2 compressed image data from a DVD, which generally compresses image in MPEG-2 format to store the image. The image input unit 110 may also receive image data of a broadcast signal. The digital broadcast standard specifies that the image is compressed in MPEG-2 format to be broadcast. Accordingly, the image input unit 110 may receive image data of a MPEG-2 compressed digital broadcast signal.

The control unit 120 controls the general operation of the image apparatus 100. Specifically, the control unit 120 may determine an original format of the inputted image data and determines a degree of noise reduction according to the determined original format. The control unit 120 then transmits the determined degree of noise reduction to the image processing unit 130.

Herein, the 'original format' refers to a format of the image data before compression. In other words, the 'original format' refers to the format of the image data which is initially recorded. The original format may be one of: 60p video, 50p video, 25p film, 60i NTSC video, 24p film, 50i PAL video, 60i NTSC 32 pulldown film, and 50i PAL 22 pulldown film.

The term '60p video' refers to a 60 frame per second (fps) progressive video image. The term '50p video' refers to 50 fps progressive video image. The term '25p film' refers to 25 fps progressive film image. The term '60i NTSC video' refers to 60 fps interlace video image corresponding to the National Television System Committee (NTSC) image, which is the North American-oriented broadcast standard. The term '24p film' refers to 24 fps progressive film image. The term '50i PAL video' refers to 50 fps interlace image corresponding to the phase-alternating line (PAL) image, which is the European broadcast standard. The term '60i NTSC 32 pulldown film' refers to 24 fps film image which is changed to 60i NTSC video image after 3:2 pulldown. The term '50i PAL 22 pulldown film' refers to 25 fps film image, which is changed to 50i PAL video image after 2:2 pulldown.

Referring to FIG. 1, the control unit 120 may include a header information extracting unit 121, a Sum of Optional Film to Telecine (SOFT) unit 123, a Statistics of Mainly Applied Rigorous Transform (SMART) unit 125, a first determining unit 127, a second determining unit 128, and a noise reduction adjusting unit 129.

The header information extracting unit 121 extracts header information from the inputted image data. The 'inputted image data' herein is MPEG-2 compressed image data. Accordingly, the header information extracting unit 121 extracts MPEG-2 header information from the inputted image data.

The MPEG-2 header information may include interlace sequence information, interlace frame information, non-repeated field information, Discrete Cosine Transform (DCT) type information, and frame rate information of the image data.

The interlace sequence information indicates whether the whole image data as inputted is interlace image or not. Accordingly, if the interlace sequence information is TRUE, the inputted image data is the interlace image. However, if the interlace sequence information indicates FALSE, the inputted image is the progressive image.

The interlace frame information is contained in each frame, to indicate whether the corresponding frame is interlace frame or not.

The non-repeated field information is also contained in each frame, to indicate whether or not the current frame is going to be repeated one more time. Accordingly, if a certain frame has the non-repeated field indicating FALSE, a frame that is the same as the certain frame is repeated after the certain frame during decoding operation. For example, in a frame having four pieces of undecoded image data 'AABB', if the second A frame has the non-repeated field information indicating FALSE, the image data after decoding becomes 'AAABB'.

The DCT type information is contained in each macroblock, to indicate a DCT type of the corresponding macroblock. The DCT type may include a field DCT and a frame DCT. The macroblock is the unit of one frame. For example, 8*8 pixels may construct one block, 4 blocks may construct one macroblock, and a plurality of macroblocks may construct one frame.

The frame rate information indicates the frame per second of the image.

Accordingly, based on the information explained above, the control unit 120 determines the original format of the inputted image data.

The SOFT unit 123 counts the frames among a plurality of frames of the inputted image data, which have the non-repeated field information indicating FALSE. By doing so, the SOFT unit 123 determines whether the inputted image data is a 3:2 pulldown image, a 2:2 pulldown image, or an interlace video image. The SOFT unit 123 then transmits to the first determining unit 127 the sum ('SOFT_FLAG_SUM') of the counted frames that have the non-repeated field indicating FALSE.

The terms '3:2 pulldown' and '2:2 pulldown' refer to the conversion of motion picture film image data into frame rates suitable for providing on television.

Specifically, the '3:2 pulldown' refers to changing the 24 fps motion picture film image data into NTSC 60 fps image data. The '2:2 pulldown' refers to changing the 25 fps motion picture film image data into 50 fps PAL image data.

If the 24 fps image has 4 frames 'ABCD', after 3:2 pulldown, the same frame is repeated three times and two times to make ten frames, resulting in 'AAABBCCCDD', so the number of frames increases 2.5-fold. Meanwhile, if 25 fps image has 4 frames 'abcd', after 2:2 pulldown, the same frame is repeated two times to make eight frames, resulting in 'aabbccdd', so the number of frames is doubled.

In compressing the 2:2 pulldown image, two frames are compressed into one single frame. For example, 'aabbccdd' are compressed into 'aa/bb/cc/dd'. In compressing the 3:2 pulldown image, two-repeating frames are compressed into one frame. However, regarding the three-repeated frames, only two frames are compressed into one frame and given the non-repeated information set to FALSE. For example, if 'AAABBCCCDD' is compressed, the compressed image data is 'AA/BB/CC/DD', in which the second A and second C have non-repeated information set to FALSE.

As explained above, the 3:2 pulldown image has half of the frames indicating FALSE and the other half indicating TRUE. However, according to 2:2 pulldown, all frames of the image have non-repeated information indicating TRUE.

Accordingly, as the SOFT unit 123 counts the number of frames in which the non-repeated field information indicate FALSE among a plurality of frames of the inputted image data, the control unit 120 is able to determine whether the inputted image data is 3:2 pulldown image or 2:2 pulldown image.

The SMART unit 125 counts the frames which have more field DCT macroblocks than the frame DCT macroblocks, among a plurality of frames of the inputted image data, with reference to the DCT type information. By doing so, it is determined whether or not the original image is a 3:2 pulldown film image.

The 3:2 pulldown film image has more field DCT macroblocks than the frame DCT macroblocks. Accordingly, the SMART unit 125 counts and obtains a sum ('SMART_FLAG_SUM') of the frames which have more field DCT macroblocks than the frame DCT macroblocks and transmits 'SMART_FLAG_SUM' to the first determining unit 127 so that the control unit 120 determines whether the image is 3:2 pulldown film image or not. The manner of counting by the SMART unit 125 will be explained below with reference to FIG. 3.

The first determining unit 127 determines whether the original format of the inputted image data is progressive image, interlace image, 2:2 pulldown film image, or 3:2 pulldown film image. The first determining unit 127 determines the original format using 'SOFT_FLAG_SUM' counted at SOFT unit 123 and 'SMART_FLAG_SUM' counted at SMART unit 125.

Specifically, if the interface sequence information indicates FALSE, the first determining unit 127 determines the original format of the inputted image data to be progressive image.

If the interlace sequence information indicates TRUE and the interlace frame information indicates TRUE, the first determining unit 127 determines the original format using the value outputted from the SMART unit 125.

If the interlace sequence information indicates TRUE and the interlace frame information indicates FALSE, the first determining unit determines the original format using the value outputted from the SOFT unit 123.

Specifically, if SOFT_FLAG_SUM counted at SOFT unit 123 indicates '0', the first determining unit determines that the original format of the inputted image data is 2:2 pulldown film image.

If SOFT_FLAG_SUM counted at the SOFT unit 123 is within a predetermined range, the first determining unit 127 determines whether SMART_FLAG_SUM counted at the SMART unit 125 is within a predetermined range or not. The predetermined range may correspond to half of the total number of frames which are the subject of counting at the SOFT unit 123, considering that the 3:2 pulldown film image has half of the frames with FALSE non-repeated information and half of the frames with TRUE non-repeated information.

If SMART_FLAG_SUM counted at the SMART unit 125 is within a predetermined range, the first determining unit 127 determines that the original format of the inputted image data is 3:2 pulldown film image. The predetermined range herein may span between half and the entire number of the frames which are the subject of the counting by the SMART unit 125, considering that the 3:2 pulldown film image has the frames having more field DCT macroblocks than the frame DCT macroblocks.

If SMART_FLAG_SUM counted at the SMART unit 125 exceeds a predetermined range, the first determining unit 127 determines the original format of the inputted image data to be interlace video image.

Additionally, the first determining unit 127 determines the original format of the inputted image data to be interlace video image, if SOFT_FLAG_SUM is not '0' nor a predetermined count value.

Upon determining the original format of the inputted image data to be progressive image, interlace video image, 2:2 pulldown film image or 3:2 pulldown film image, the first determining unit 127 sends the determination to the second determining unit 128.

The second determining unit 128 determines whether the original format of the inputted image data is film image or video image, using the frame rate information. Therefore, the second determining unit 128 finally confirms the original format of the inputted image data.

Specifically, if the image data, which is determined to be a progressive image at the first determining unit 127, has 60 fps or 50 fps of frame rate, the second determining unit 128 makes a final determination that the original format of the inputted image data is 60p video or 50p video. If the image data, which is determined to be a progressive image at the first determining unit 127, has 25 fps or 24 fps of frame rate, the second determining unit 128 makes a final determination that the original format of the inputted image data is 25p film or 24p film.

If the image data, which is determined to be the interlace video at the first determining unit 127, has 30 fps of frame rate, the second determining unit 128 makes a final determination that the original format of the inputted image data is 60i NTSC video. If the image data, which is determined to be the interlace video at the first determining unit 127, has 25 fps of frame rate, the second determining unit 128 makes a final determination that the original format of the inputted image data is 50i PAL video.

If an image is determined to be a 2:2 pulldown film image at the first determining unit 127, and has a 25 fps frame rate, the second determining unit 128 makes a final determination that the original format of the inputted image data is the 50i PAL 2:2 pulldown film.

If an image is determined to be a 3:2 pulldown film image at the first determining unit 127, and has a 30 fps frame rate, the second determining unit 128 makes a final determination that the original format of the inputted image data is the 60i NTSC 3:2 pulldown film.

As a result, the second determining unit 128 determines the original format of the inputted image data finally.

The noise reduction adjusting unit 129 adjusts the degree of noise reduction according to the determined type of the original format. Specifically, the noise reduction adjusting unit 129 may set a higher degree of noise reduction with respect to inputted image data whose original format corresponds to the interlace image data than image data whose original format corresponds to progressive image data. The noise reduction adjusting unit 129 may also set a higher degree of noise reduction with respect to inputted image data whose original format corresponds to a motion picture film image than image data whose original format corresponds to a video image. Furthermore, the noise reduction adjusting unit 129 may set a higher degree of noise reduction with respect to inputted image data whose original format corresponds to NTSC image data than image data whose original format corresponds to PAL image data.

FIG. 4 lists the image formats and the respective corresponding degrees of noise reduction which are tabulated according to the exemplary embodiment described above. That is, FIG. 4 illustrates a table of degrees of noise reduction corresponding to the original formats of the image data, according to an exemplary embodiment of the present invention.

Referring to FIG. 4, the degree of noise reduction is set in a manner in which the degree is 'Low', if the original image is progressive, 'High' if interlace, low' if video image, 'High' if film image, 'Low' if NTSC image, and 'High' if PAL image.

The reason for setting the degree of noise reduction in the above manner will be explained below.

Most MPEG-2 compression image for broadcasting and DVD is made in an interlace form. As necessary, the interlace image is made in a field-to-frame manner before MPEG-2 compression, and this increases the possibility that the image gets complicated and has much compression digital noise. The 'compression digital noise' may mainly include a blocky noise which is generated as the DCT transformed data is DCT quantized, or a mosquito or ringing which are generated if a flat area is affected by an edge of a macroblock which is the basic unit of DCT.

An image captured on film or a professional video camera is made in a progressive form, and the progressive compression image has less compression digital noise than the interlace compression image does. This is because the progressive image can be determined to be less complicated than the interlace image at the MPEG-2 encoder, and accordingly has less compression digital noise.

Therefore, image data which is in a progressive image original format is preferably set to have 'Low' noise reduction degree, while image data which is in an interlace image original format is preferably set to have 'High' noise reduction, since the interlace image generally has more noise.

Meanwhile, the degree of image details varies, depending on whether the original image is captured on film or as a video. Image recording apparatuses of different specification are used to capture film image and the video image. For example, the film recording apparatus has relatively lower spatial frequency and mid frequency, while the video recording apparatus has relatively higher spatial frequency. Accordingly, the film image having lower mid frequency detail has a lower possibility of generating artifacts in the image even with an increased level of compression digital noise processing. However, the video image has relatively more details, and thus has a relatively higher possibility of generating artifacts with an increased level of compression digital noise processing.

Therefore, the image data which is in a video image original format is preferably set to have 'Low' noise reduction degree, while the image data which is in a film image original format is set to have 'High' noise reduction degree.

Meanwhile, in North America, NTSC is adopted as the digital broadcast standard, which also transmits high definition (HD) image data. In Europe where the PAL is adopted as the digital broadcast standard, the standard definition (SD) image is transmitted. In other words, there are HD and SD images transmitted in North America, while there are mainly SD images transmitted in Europe.

Since the HD image has many details, it also has a high possibility of generating artifacts during compression digital noise reduction. Accordingly, it is necessary to not set the degree of noise process to high. However, since the SD image has less detail than the HD image, the SD image has less possibility of generating artifact even when the degree of noise process is increased.

Accordingly, the image data which is in NTSC image original format is preferably set to have 'Low' noise reduction degree, while the image data which is in PAL image original format is set to have 'High' noise reduction degree.

By adjusting the degree of noise reduction in accordance with the original format of the image data, optimal noise reduction can be achieved. The desired degrees of noise reduction are tabulated in FIG. 4.

However, the degree of noise reduction may also be adjusted in accordance with the original format of the image data, in other manners.

The noise reduction adjusting unit 129 adjusts the degree of noise reduction in accordance with the original format determined, with reference to the table of FIG. 4, and transmits the adjusted degree of noise reduction to the image processing unit 130.

The image processing unit 130 performs image processing of the inputted image data such as encoding, scaling and noise reduction. Specifically, the image processing unit 130 performs noise reduction of the inputted image data in accordance with the degree of noise reduction inputted from the control unit 120. The image processing unit 130 then transmits the processed image to the image output unit 140.

The image output unit 140 outputs the processed image to a display screen inside the image apparatus 100. The image output unit 140 may also output the processed image to an external display device.

As explained above, the image apparatus 100 is able to determine the original format of the inputted image data and accordingly adjust the degree of noise reduction.

Figure 2A:
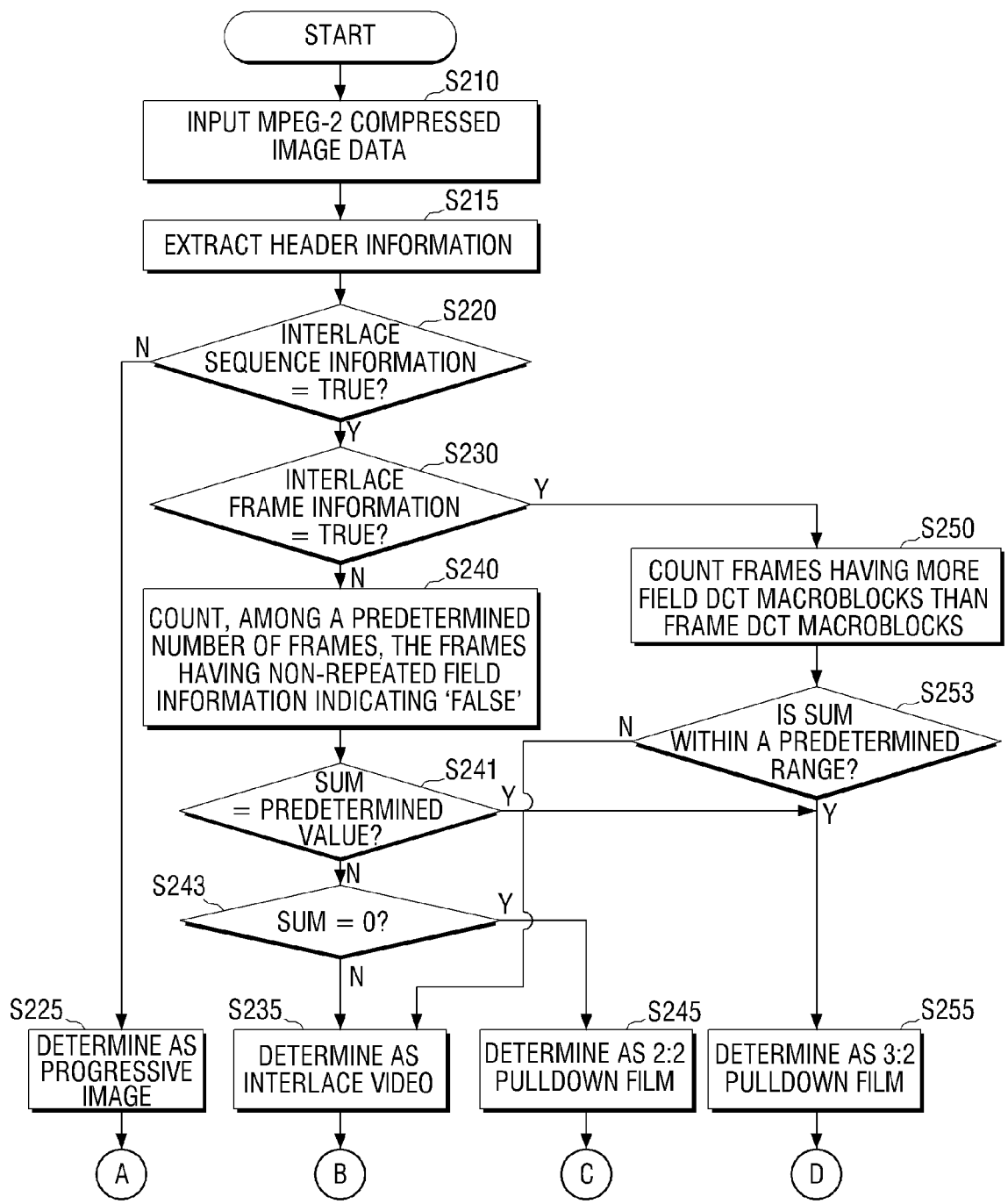
FIGS. 2A and 2B are flowcharts provided to explain a method for determining original format of image data in accordance with an exemplary embodiment of the present invention.
Figure 2B:
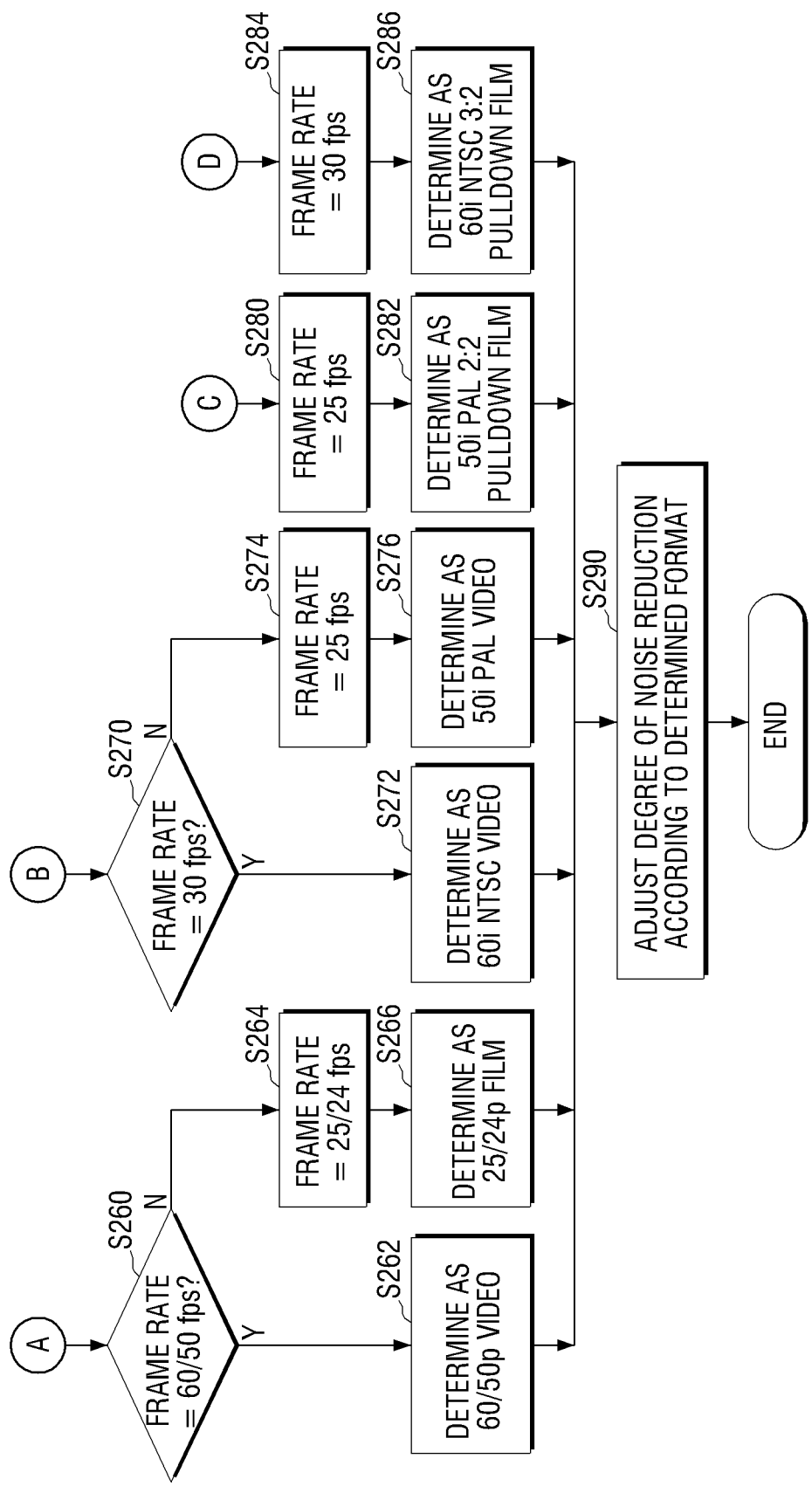

Hereinbelow, a method of determining the original format of inputted image data will be explained in greater detail with reference to FIGS. 2A and 2B. FIGS. 2A and 2B are flowcharts provided to explain a method for determining original format of the image data according to an exemplary embodiment of the present invention.

At S210, the image apparatus 100 receives MPEG-2 compressed image data. The image apparatus 100 may receive the image data from a storage medium which stores MPEG-2 compressed image. By way of example, the image apparatus 100 may receive MPEG-2 compressed image data from a DVD, which generally compresses image in MPEG-2 format to store the image. The image apparatus 100 may also receive image data from a broadcast signal. The digital broadcast standard specifies that the image is compressed in MPEG-2 format to be broadcast. Accordingly, the image apparatus 100 may receive image data from a MPEG-2 compressed digital broadcast signal.

At S215, the image apparatus 100 extracts header information of the inputted image data. The inputted image data in the exemplary embodiment is MPEG-2 compressed image data. Accordingly, the header information extracting unit 121 extracts MPEG-2 header information from the inputted image data.

The MPEG-2 header information may include interlace sequence information, interlace frame information, non-repeated field information, Discrete Cosine Transform (DCT) type information, and frame rate information of the image data.

Next, the image apparatus 100 determines whether the interlace sequence information is TRUE or not, at S220. If the interlace sequence information is FALSE at S220—N, the image apparatus 100 determines the original format of the inputted image data to be progressive image at S225.

If the interlace sequence information is TRUE at S220—Y, the image apparatus 100 determines whether the interface frame information is TRUE or not at S230. If the interlace frame information is TRUE at S230—Y, the image apparatus 100 counts the frames of a predetermined number of frames of the inputted image data, which have more field DCT macroblocks than frame DCT macroblocks, at S250. By doing so, it is determined whether the original image is 3:2 pulldown film image or not.

The 3:2 pulldown film image has more field DCT macroblocks than the frame DCT macroblocks. Accordingly, the image apparatus 100 counts and obtains a sum ('SMART_FLAG SUM') of the frames which have more field DCT macroblocks than the frame DCT macroblocks. The manner of counting by the image apparatus 100, and more specifically, by the SMART unit 125, will be explained below in greater detail.

Figure 3:
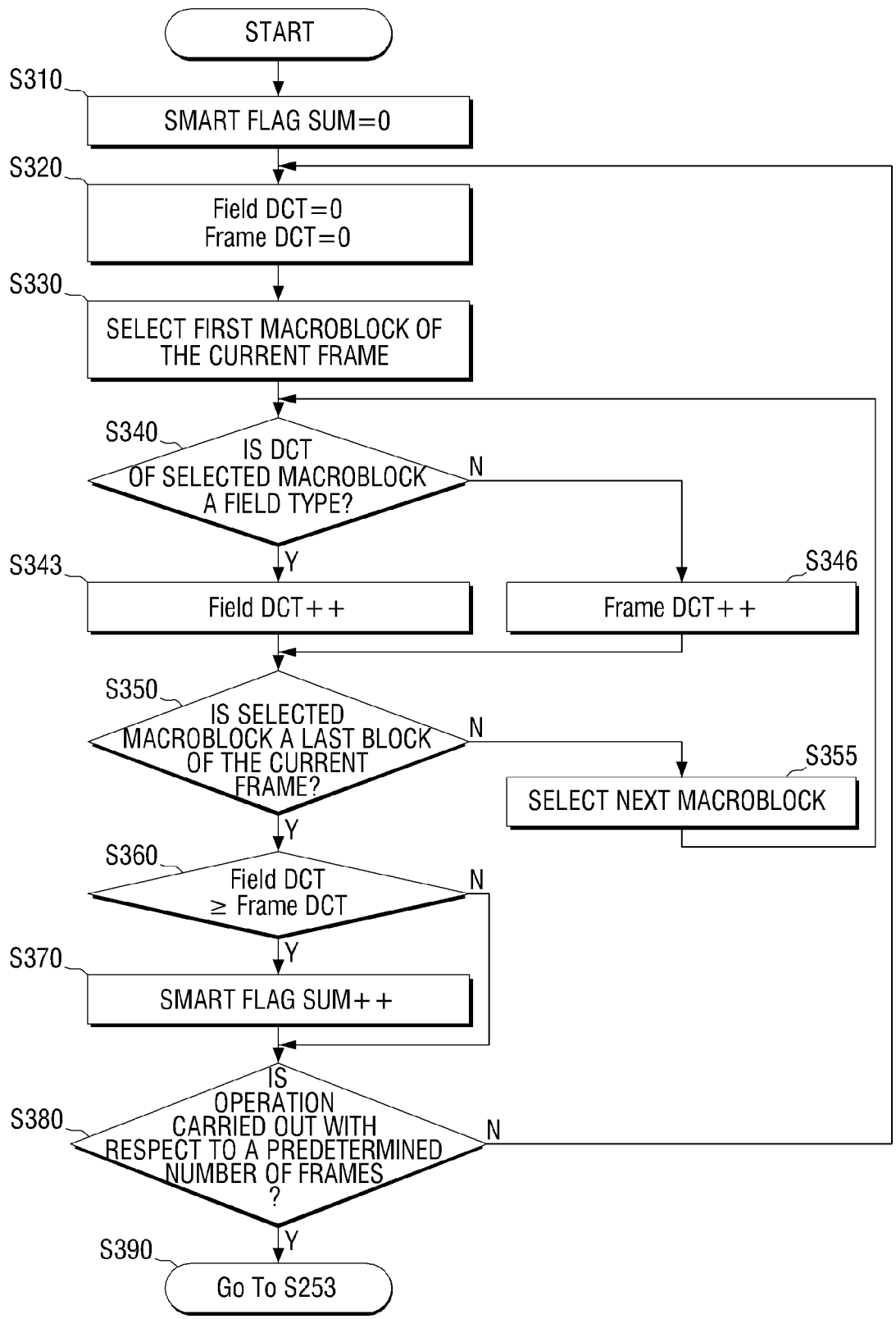
FIG. 3 is a flowchart provided to explain a method for counting frames which have more field DCT macroblocks than frame DCT macroblocks, according to an exemplary embodiment of the present invention.

FIG. 3 is a flowchart provided to explain a method for counting frames (that is, obtaining SMART_FLAG_SUM) which have more field DCT macroblocks than frame DCT macroblocks, according to an exemplary embodiment of the present invention.

First, the image apparatus 100 initializes SMART_FLAG_SUM to 0 at S310. The image apparatus 100 then initializes the field DCT parameter and frame DCT parameter to 0, respectively, at S320. Herein, the 'field DCT parameter' represents the number of field DCT macroblocks within one frame, and the 'frame DCT parameter' represents the number of frame DCT macroblocks within one frame.

The image apparatus 100 selects the first macroblock of the current frame as the target of counting, at S330. Next, the image apparatus 100 determines whether the DCT of the selected macroblock is field DCT or not, with reference to the DCT type information, at S340.

If the DCT of the selected macroblock is field DCT at S340—Y, the image apparatus 100 adds 1 to the field DCT parameter, at S343. However, if the DCT of the selected macroblock is frame DCT at S340—N, the image apparatus 100 adds 1 to the frame DCT parameter, at S346.

Next, the image apparatus determines whether the selected macroblock is the last macroblock of the current frame or not, at S350. If the selected macroblock is not the last macroblock of the current frame at S350—N, the image apparatus 100 selects the next macroblock as the target of counting at S355, and repeats operation from S340.

However, if the selected macroblock is the last macroblock of the current frame at S350—Y, the image apparatus 100 determines whether the field DCT parameter is equal to, or larger than the frame DCT parameter, at S360. If the field DCT parameter is equal to, or larger than the frame DCT parameter at S360—Y, the image apparatus 100 adds 1 to SMART_FLAG_SUM, at S370.

Next, the image apparatus 100 determines whether or not counting is carried out with respect to a predetermined number of frames, at S380. If not at S380—N, the image apparatus 100 repeats operation from S320 to carry out counting with respect to the predetermined number of frames.

If counting is carried out for the predetermined number of frames at S380—Y, operation at S253 is carried out at S390.

As a result, the image apparatus 100 and more particularly, the SMART unit 125 obtains SMART_FLAG_SUM which represents the number of frames having more field DCT macroblocks than frame DCT macroblocks.

Referring back to FIG. 2A, the image apparatus 100 determines whether SMART_FLAG_SUM obtained at S250, is within a predetermined range, at S253. The predetermined range herein may span between the half number and the whole number of the frames which are the subject of the counting, considering that the 3:2 pulldown film image has the frames having more field DCT macroblocks than the frame DCT macroblocks.

If SMART_FLAG_SUM obtained is within the predetermined range at S253—Y, the image apparatus 100 determines the original format of the inputted image data is 3:2 pulldown film image at S255. However, if SMART_FLAG_SUM exceeds a predetermined range at S253—N, the image apparatus 100 determines the original format of the inputted image data to be interlace video image, at S235.

On the other hand, if the interlace frame information indicates FALSE at S230—N, the image apparatus 100 counts the frames in which non-repeated field information indicates FALSE, and thus obtains a sum of the counted frames ('SOFT_FLAG SUM') of a predetermined number of frames of the inputted image data, at S240. By doing so, it is determined whether the inputted image data corresponds to 3:2 pulldown image, 2:2 pulldown image, or interlace video image.

The image apparatus 100 determines whether SOFT_FLAG_SUM corresponds to a predetermined value, at S241. The predetermined value may be half of the total number of frames which are the subject of counting at the SOFT unit 123, considering that the 3:2 pulldown film image has half frames with FALSE non-repeated information and half frames with TRUE non-repeated information.

If SOFT_FLAG_SUM does not correspond to a predetermined value at S241—N, the image apparatus determines whether SOFT_FLAG_SUM corresponds to 0, at S243.

If SOFT_FLAG_SUM corresponds to 0, the image apparatus 100 determines the original format of the inputted image data to be 2:2 pulldown film image, at S245. This is because the 2:2 pulldown film image does not have a frame having non-repeated information indicating FALSE.

However, if SOFT_FLAG_SUM does not correspond to 0 at S243—N, the image apparatus 100 determines the original format of the inputted image data to be interlace video, at S235.

If SOFT_FLAG_SUM corresponds to a predetermined value at S241—Y, the image apparatus 100 determines the original format of the inputted image data to be 3:2 pulldown film image, at S255.

Next, referring to the frame rate information of the MPEG-2 header information of the inputted image data, the image apparatus 100 determines if the frame rate of the image data, which is determined to be progressive image in original format, is 60 fps or 50 fps, at S260.

If the frame rate of the image data is 60 fps or 50 fps at S260—Y, the image apparatus 100 determines finally that the original format of the inputted image data is 60p video or 50p video, at S262.

However, if the frame rate of the image data is not 60 fps or 50 fps at S260—N, the image apparatus 100 determines that the frame rate is 25 fps or 24 fps at S264, and determines finally that the original format of the inputted image data is 25p film or 24 film, at S266.

Meanwhile, with reference to the frame rate information of the MPEG-2 header information of the inputted image data, the image apparatus 100 determines if the frame rate of the image data, which is determined to be interlace video at S235, is 30 fps, at S270.

If the frame rate of the image data is 30 fps at S270—Y, the image apparatus 100 determines finally that the original format of the inputted image data is 60i NTSC video, at S272.

However, if the frame rate of the image data is not 30 fps at S270—N, the image apparatus 100 determines that the frame rate is 25 fps at S274, and determines finally that the original format of the inputted image data is 50i PAL video, at S276.

Meanwhile, if the original format is determined to be 2:2 pulldown film image at S245, the image apparatus 100 determines if the frame rate of the inputted image data is 25 fps, with reference to the frame rate information of the MPEG-2 header image of the inputted image data, at S280, and determines finally that the original format of the inputted image data is 50i PAL 2:2 pulldown film, at S282.

If the original format is determined to be 3:2 pulldown film image at S255, the image apparatus 100 determines if the frame rate of the inputted image data is 30 fps, with reference to the frame rate information of the MPEG-2 header image of the inputted image data, at S284, and determines finally that the original format of the inputted image data is 60i NTSC 3:2 pulldown film, at S286.

Next, the image apparatus 100 adjusts the degree of noise reduction according to the determined type of original format, with reference to the table of FIG. 4, at S290. Specifically, the image apparatus sets higher degree of noise reduction for inputted image data which is in interlace image original format than for image data which is in progressive image original format. The image apparatus 100 also sets higher degree of noise reduction for inputted image data which is in film image original format than for image data which is in video image original format. The image apparatus 100 also sets higher degree of noise reduction for inputted image data which is in PAL image original format than for image data which is in NTSC image original format.

Accordingly, the image apparatus 100 determines the original format of the inputted image data and adjusts a degree of noise reduction according to the determined original format.

Although the image apparatus 100 explained above is particularly described as one that receives MPEG-2 compressed image data by way of example, one will understand that any type of image apparatus is applicable. For example, the image apparatus 100 may be a blue-ray (BD) player, a DVD player, a TV, or a settop.

Furthermore, although the examples explained above focuses on the operation of adjusting a degree of noise reduction according to the determined type of original format, the examples of the present invention may be applied to the other image processing. For example, different types of deinterlacing or frame rate conversion (FRC) may be applied, in accordance with the original format of the inputted image data.

According to the various exemplary embodiments of the present invention, an image apparatus and an image processing method thereof are capable of determining the original format of the inputted image data and determining an appropriate degree of noise reduction suitable for the original format. As a result, an optimized noise reduction is provided.

Particularly, since the degree of noise reduction is adjusted in accordance with the original format of the inputted image data before compression, the optimized noise reduction according to the original format can be carried out. Furthermore, other image processing, such as deinterlacing or frame rate conversion (FRC) can be appropriately carried out in accordance with the original format of the image data.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image apparatus comprising:
    an image input unit which receives image data comprising information regarding an original format type of original image before compression; and
    a control unit which determines the original format type of the received image data by using the information, and determines a degree of noise reduction in accordance with the determined original format type,
    wherein the original format type is a format type of the image data which is initially recorded,
    wherein the control unit determines the degree of noise reduction based on a pre-stored setting in which the original format type and corresponding degree of noise reduction is pre-determined, and
    wherein the control unit sets a higher degree of noise reduction for image data which is in Phase Alternation Line (PAL) image original format type than image data which is in National Television System Committee (NTSC) image original format type.

2. The image apparatus as claimed in claim 1, wherein the control unit determines the original format type of the inputted image data, using header information of the inputted image data.

3. The image apparatus as claimed in claim 2, wherein the inputted image data is Motion Picture Experts Group 2 (MPEG-2) compressed image data, and the header information is MPEG-2 header information.

4. The image apparatus as claimed in claim 1, wherein the control unit determines the original format type of the inputted image data, using at least one of: interlace sequence information, interlace frame information, non-repeated field information, discrete cosine transform (DCT) type information, and frame rate information of the inputted image data.

5. The image apparatus as claimed in claim 4, wherein the control unit determines the original format type of the inputted image data to be progressive image, if the interlace sequence information indicates FALSE.

6. The image apparatus as claimed in claim 4, wherein the control unit determines the original format type of the inputted image data to be interlace video image, if the interlace sequence information indicates TRUE and the interlace frame information indicates TRUE.

7. The image apparatus as claimed in claim 4, wherein the control unit determines the original format type of the inputted image data using the DCT type information, if the interlace sequence information indicates TRUE and the interlace frame information indicates TRUE, and determines the original format type of the inputted image data using the non-repeated field information, if the interlace sequence information indicates TRUE and the interlace frame information indicates FALSE.

8. The image apparatus as claimed in claim 7, wherein if the interlace sequence information indicates TRUE and the interlace frame information indicates FALSE, the control unit counts, among a predetermined number of frames of the inputted image data, frames having the non-repeated field indicating FALSE, and
 if the number of frames having the non-repeated field information indicating FALSE is 0, the control unit determines the original format of the inputted image data to be 2:2 pulldown film image,
 if the number of frames having the non-repeated field information indicating FALSE is a predetermined value, the control unit determines the original format of the inputted image data to be 3:2 pulldown film image, and
 if the number of frames having the non-repeated field information indicating FALSE is not 0 nor the predetermined value, the control unit determines the original format of the inputted image data to be interlace video image.

9. The image apparatus as claimed in claim 7, wherein if the interlace sequence information indicates TRUE and the interlace frame information indicates TRUE, the control unit counts, among a predetermined number of frames of the inputted image data, frames having more field DCT macroblocks than frame DCT macroblocks with reference to the DCT type information, and
 determines the original format type of the inputted image data to be 3:2 pulldown film image, if the number of the counted frames is within a predetermined range, and
 determines the original format type of the inputted image data to be interlace video image, if the number of the counted frames is not within the predetermined range.

10. The image apparatus as claimed in claim 4, wherein the control unit determines the original format type of the inputted image data to be one of film image and video image, using the frame rate information.

11. The image apparatus as claimed in claim 1, wherein the control unit sets a higher degree of noise reduction for image data which is in interlace image original format type than for image data which is in progressive image original format type, and
 sets a higher degree of noise reduction for image data which is in film image original format type than for image data which is in video image original format type.

12. The image apparatus as claimed in claim 1, wherein the control unit determines the original format of the inputted image data to be one of 60p video, 50p video, 25p film, 60i NTSC video, 24p film, 50i PAL video, 60i NTSC 3:2 pulldown film, and 50i PAL 2:2 pulldown film.

13. An image processing method by a processor, comprising:
 receiving an image data comprising information regarding an original format type of original image before compression; determining the original format type of the received image data by using the information; and determining a degree of noise reduction in accordance with the determined original format type, wherein the original format type is a format type of the image which is initially recorded, and wherein the determining the degree of noise reduction comprises determining the degree of noise reduction based on a pre-stored setting in which the original format type and corresponding degree of noise reduction is pre-determined, and wherein the determining the original format type comprises setting a higher degree of noise reduction for image data which is in Phase Alteration Line (PAL) image original format type than image which is in National Television System Committee (NTSC) image original format type.

14. The image processing method as claimed in claim 13, wherein the determining the original format type comprises determining the original format type of the inputted image data, using header information of the inputted image data.

15. The image processing method as claimed in claim 14, wherein the inputted image data is Motion Picture Experts Group 2 (MPEG-2) compressed image data, and the header information is MPEG-2 header information.

16. The image processing method as claimed in claim 13, wherein the determining the original format type comprises determining the original format type of the inputted image data, using at least one of: interlace sequence information, interlace frame information, non-repeated field information, discrete cosine transform (DCT) type information, and frame rate information of the inputted image data.

17. The image processing method as claimed in claim 16, wherein the determining the original format type comprises determining the original format type of the inputted image data to be progressive image, if the interlace sequence information indicates FALSE.

18. The image processing method as claimed in claim 16, wherein the determining the original format type comprises determining the original format type of the inputted image data to be interlace video image, if the interlace sequence information indicates TRUE and the interlace frame information indicates TRUE.

19. The image processing method as claimed in claim 16, wherein the determining the original format type comprises determining the original format type of the inputted image data using the DCT type information, if the interlace sequence information indicates TRUE and the interlace frame information indicates TRUE, and
 determining the original format type of the inputted image data using the non-repeated field information, if the interlace sequence information indicates TRUE and the interlace frame information indicates FALSE.

20. The image processing method as claimed in claim 19, wherein the determining the original format type comprises counting frames, of a predetermined number of frames of the inputted image data, having the non-repeated field indicating FALSE, if the interlace sequence information indicates TRUE and the interlace frame information indicates FALSE, and
 if the number of frames having the non-repeated field information indicating FALSE is 0, determining the original format of the inputted image data to be 2:2 pulldown film,
 if the number of frames having the non-repeated field information indicating FALSE is a predetermined value, determining the original format of the inputted image data to be 3:2 pulldown film, and
 if the number of frames having the non-repeated field information indicating FALSE is not 0 nor the predetermined value, determining the original format of the inputted image data to be interlace video image.

21. The image processing method as claimed in claim 19, wherein the determining original format type comprises counting frames, of a predetermined number of frames of the inputted image data, having more field DCT macroblocks than frame DCT macroblocks, with reference to the DCT type information, if the interlace sequence information indicates TRUE and the interlace frame information indicates TRUE, and determining the original format type of the inputted image data to be 3:2 pulldown film image, if the number of the counted frames is within a predetermined range, and determining the original format type of the inputted image data to be interlace video image, if the number of the counted frames exceeds the predetermined range.

22. The image processing method as claimed in claim 16, wherein the determining the original format type comprises determining the original format type of the inputted image data to be one of film image and video image, using the frame rate information.

23. The image processing method as claimed in claim 13, wherein the determining the original format type comprises setting a higher degree of noise reduction for image data which is in interlace image original format type than for image data which is in progressive image original format type, and setting a higher degree of noise reduction for image data which is in film image original format type than for image data which is in video image original format type.

24. The image processing method as claimed in claim 13, wherein the determining the original format type comprises determining the original format type of the inputted image data to be one of 60p video, 50p video, 25p film, 60i NTSC video, 24p film, 50i PAL video, 60i NTSC 3:2 pulldown film, and 50i PAL 2:2 pulldown film.

25. An image apparatus comprising:
    an image input unit which receives image data being compressed by Motion Picture Experts Groups 2 (MPEG-2) and comprising information regarding an original formal type of Original image before compression; and
    a control unit which determines an original format type of the received image data, by using MPEG-2 header information of the received image data, as the information, and determines a degree of noise reduction in accordance with the determined original format type,
    wherein the original type is a format type of the image which is initially recorded,
    wherein the control unit determines the degree of noise reduction based on a pre-stored Setting in which the original format type and corresponding degree of noise reduction is pre-determined, and
    wherein the control unit sets a higher degree of noise reduction for image data which is in Phase Alternation Line (PAL) image original format type than image data which is in National Television System Committee (NTSC) image original format type.

26. The image apparatus as claimed in claim 25, wherein the control unit determines the original format type of the inputted image data, using at least one of: interlace sequence information, interlace frame information, non-repeated field information, discrete cosine transform (DCT) type information, and frame rate information of the inputted image data.

27. The image apparatus as claimed in claim 25, wherein the control unit sets deinterlacing or frame rate conversion for the inputted image data, depending on the determined original format type.

28. An image processing method by a processor, comprising:
    receiving image data being compressed by Motion Picture Experts Groups 2 (MPEG-2) and comprising information regarding an original format type of original image before compression; determining the original format type of the received image data, by using MPEG-2 header information of the received image data, as the information; and
    determining a degree of noise reduction in accordance with the determined original format type, wherein the original format type is a format type of the image which is initially recorded, and wherein the determining the degree of noise reduction comprises determining the degree of noise reduction based on a pre-stored setting in which the original format type and corresponding degree of noise reduction is pre-determined, and
    wherein the determining the original format type comprises setting a higher degree of noise reduction for image data which is in Phase Alternation Line (PAL) image original format type than image data which is in National Television System Committee (NTSC) image original format type.

29. The image processing method as claimed in claim 28, wherein the determining comprises determining the original format type of the inputted image data, using at least one of: interlace sequence information, interlace frame information, non-repeated field information, discrete cosine transform (DCT) type information, and frame rate information of the inputted image data.

30. The image processing method as claimed in claim 28, further comprising setting deinterlacing or frame rate conversion for the inputted image data, depending on the determined original format type.

31. The image apparatus as claimed in claim 1, wherein when the compressed image data is decoded, the noise is reduced by processes of brightness or saturation of frame pixels.

32. The image processing method as claimed in claim 13, wherein when the compressed image data is decoded, the noise is reduced by processes of brightness or saturation of frame pixels.

33. The image apparatus as claimed in claim 25, wherein when the compressed image data is decoded, the noise is reduced by processes of brightness or saturation of frame pixels.

34. The image processing method as claimed in claim 28, wherein when the compressed image data is decoded, the noise is reduced by processes of brightness or saturation of frame pixels.

* * * * *